(12) United States Patent
Varick

(10) Patent No.: US 10,140,524 B2
(45) Date of Patent: Nov. 27, 2018

(54) SPARE TIRE BACKUP CAMERA MOUNTING SYSTEM

(71) Applicant: BrandMotion, LLC, Southfield, MI (US)

(72) Inventor: John F. Varick, Ann Arbor, MI (US)

(73) Assignee: BrandMotion, LLC, Southfield, MI (US)

( * ) Notice: Subject to any disclaimer, the term of this patent is extended or adjusted under 35 U.S.C. 154(b) by 0 days.

(21) Appl. No.: 15/267,114

(22) Filed: Sep. 15, 2016

(65) Prior Publication Data

US 2017/0072856 A1    Mar. 16, 2017

Related U.S. Application Data

(60) Provisional application No. 62/218,805, filed on Sep. 15, 2015.

(51) Int. Cl.
*B60R 11/04* (2006.01)
*G06K 9/00* (2006.01)
*B62D 43/02* (2006.01)

(52) U.S. Cl.
CPC .......... *G06K 9/00791* (2013.01); *B60R 11/04* (2013.01); *B62D 43/02* (2013.01)

(58) Field of Classification Search
CPC ..... B60R 9/06; B60R 2011/004; B60R 11/04; B62D 43/00; B62D 43/02

(Continued)

(56) References Cited

U.S. PATENT DOCUMENTS 1,789,509 A * 1/1931 Bergstrom ............. A01K 97/10
    248/276.1
4,081,117 A * 3/1978 Crane ....................... B62J 9/00
    224/413

(Continued)

FOREIGN PATENT DOCUMENTS

JP         07137575 A  *  5/1995
JP      2008024199 A  *  2/2008

(Continued)

OTHER PUBLICATIONS http://www.aev-conversions.com/shop/aev-rear-vision-system, last visited Aug. 3, 2014 via the Internet Archive Wayback Machine (lower left thumbnail photo selected).*

(Continued)

*Primary Examiner* — Scott McNurlen
(74) *Attorney, Agent, or Firm* — Great Lakes Intellectual Property, PLLC

(57) ABSTRACT

A monitoring system sufficient to provide a driver with video or other visual indicators for purposes of assessing an area external to a vehicle when underway is contemplated. The monitoring system may be configured as a camera-based monitoring system including a camera for viewing blind spots or other difficult to view areas when a vehicle is driven in reverse or otherwise operating in a manner where a direction of travel or other course of action produces a hazard or other concern within an exterior environment difficult for the driver to view or otherwise assess. The monitoring system may include a mounting system sufficient for mounting the camera to a spare-tire hub assembly used for securing a spare tire to a rear door or other rear-facing component of the vehicle in an exposed, vertical orientation.

16 Claims, 5 Drawing Sheets

(58) Field of Classification Search
USPC ............... 224/446, 444, 42.12–42.14, 42.2, 224/42.24–42.25; 414/464–466, 463; 248/279.1, 276.1
See application file for complete search history.

(56) References Cited

U.S. PATENT DOCUMENTS

| | | | | |
|---|---|---|---|---|
| 4,948,021 | A * | 8/1990 | Murphy | B60R 9/06 224/42.13 |
| 5,137,192 | A * | 8/1992 | Sheridan | B62D 43/02 211/17 |
| 5,745,170 | A * | 4/1998 | Palmer | H04N 5/2251 248/283.1 |
| 6,889,881 | B2 | 5/2005 | Wilkens | |
| 7,068,289 | B2 | 6/2006 | Satoh | |
| 2011/0149077 | A1* | 6/2011 | Robert | B60R 1/00 348/148 |
| 2013/0345929 | A1* | 12/2013 | Bowden | B60R 1/00 701/36 |

FOREIGN PATENT DOCUMENTS

| | | | | |
|---|---|---|---|---|
| JP | 2010018138 | A | * | 1/2010 |
| JP | 2010173542 | A | * | 8/2010 |

OTHER PUBLICATIONS http://www.aev-conversions.com/shop/aev-rear-vision-system, last visited Aug. 3, 2014 via the Internet Archive Wayback Machine (upper right thumbnail photo selected).*
http://www.trucktrend.com, "AEV JK Rear Vision Systems—Product Spotlight", published Apr. 8, 2014.*
http://www.aev-conversions.com/shop/aev-rear-vision-system, last visited Aug. 3, 2014 via the Wayback Internet Archive (pdf includes multiple photos selected (i.e. enlarged) from the webpage).*

* cited by examiner

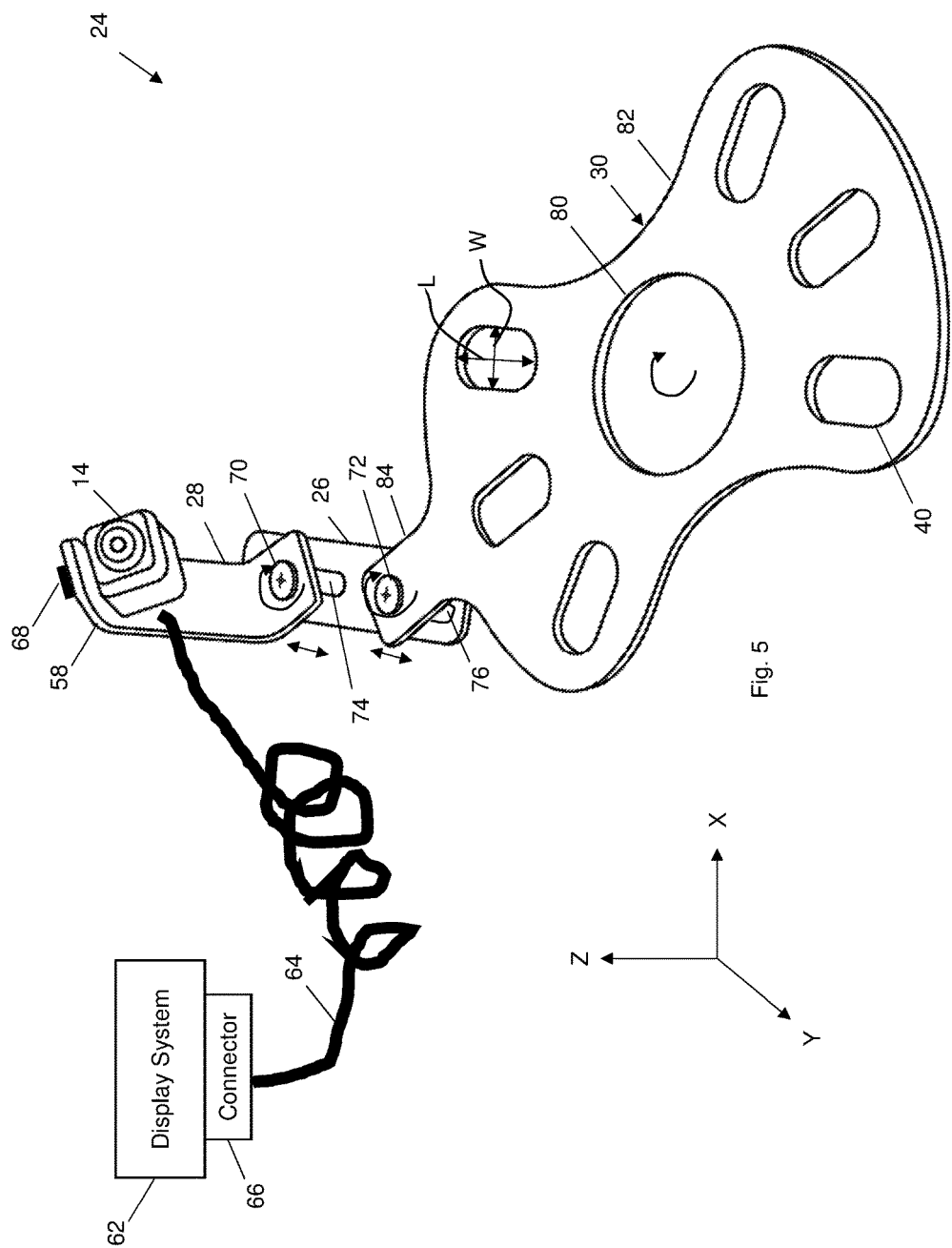

SPARE TIRE BACKUP CAMERA MOUNTING SYSTEM

CROSS-REFERENCE TO RELATED APPLICATIONS

This application claims the benefit of U.S. provisional Application No. 62/218,805 filed Sep. 15, 2015 the disclosure and benefit of which is incorporated in its entirety by reference herein.

TECHNICAL FIELD

The present invention relates to monitoring systems sufficient to provide a driver with video or other visual indicators for purposes of assessing an area external to a vehicle when underway, such as but not necessary limited to a camera-based monitoring system for viewing blind spots or other difficult to view areas when a vehicle is driven in reverse or otherwise operating in a manner where a direction of travel or other course of action produces a hazard or other concern within an exterior environment difficult for the driver to view or otherwise assess.

BACKGROUND

Various types of vessels, automobiles, planes, trailers, etc., collectively and interchangeably referred to as vehicles, may include a camera-based monitoring system to provide a driver with video of blind spots or other difficult to view areas when underway. One such system for automobiles commonly includes a passenger-compartment display operating in cooperation with a camera mounted to a rear bumper or other rear-facing portion of the automobile to enable a driver to view an rearward area when traveling in reverse. The system may be included at the time of vehicle manufacturer/assembly as an original equipment manufacturer (OEM) system and added after vehicle manufacturer/assembly as an aftermarket system. The OEM systems can become problematic and operate improperly when additional aftermarket components are added to obstruct a viewing angle of an OEM camera, e.g., the OEM bumper camera may become obstructed when an OEM spare tire is replaced with a larger aftermarket spare tire. The aftermarket systems can present difficulties when modifying the vehicle to accommodate a support or other structure needed to secure an aftermarket camera, e.g., through-hole drilling or other techniques for retaining an aftermarket camera may damage or permanently disfigure body panels, bumpers, etc. One non-limiting aspect of the present invention contemplates ameliorating these and other issues attendant to use of both the OEM and aftermarket systems.

BRIEF DESCRIPTION OF THE DRAWINGS

FIG. 5 illustrates a perspective view of the monitoring system in accordance with one non-minting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
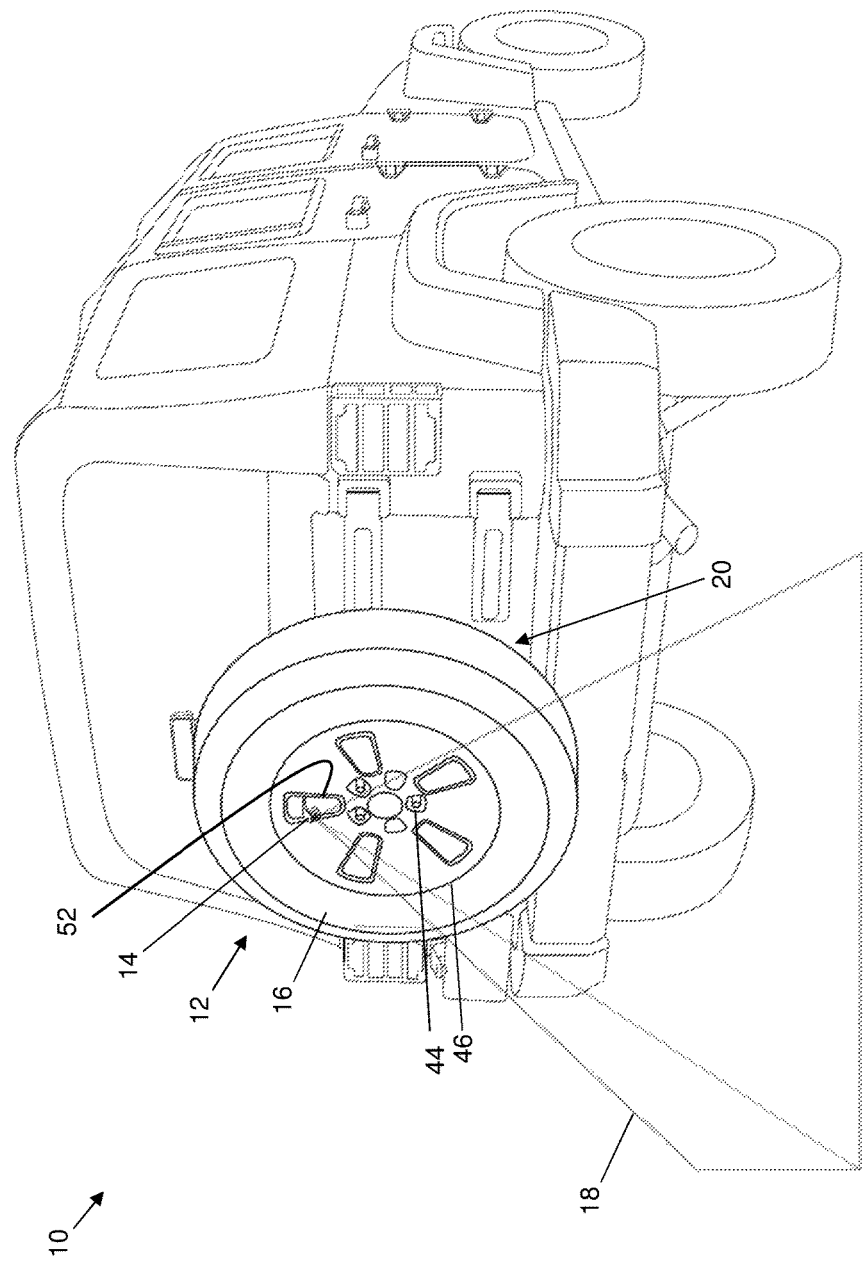
FIG. 1 illustrates a vehicle having a monitoring system in accordance with one non-limiting aspect of the present invention.

FIG. 1 illustrates a vehicle 10 having a monitoring system 12 in accordance with one non-limiting aspect of the present invention. The monitoring system 12 is shown to include a camera 14 mounted proximate a spare tire 16 to facilitate recording or otherwise capturing images and/or video of an area behind the vehicle 10 for display to a vehicle occupant via a passenger-compartment display system (not shown). The present invention is predominately described with respect to the monitoring system 12 being particularly suitable for providing assistance when operating an automobile in reverse or in another manner where it may be desirable to provide the driver or other vehicle occupant with video of blind spots, difficult to view areas or other external areas captured with the camera 14. While the present invention is predominately described with respect to automobile usage and capturing video, this is done for exemplary non-limiting purposes as the present invention fully contemplates its use and application with other vehicles, vessels, planes, trailers, etc., collectively and interchangeably referred to as vehicles, as well as for mounting other devices besides and/or in addition to the camera, e.g., other sensor devices like radar, infrared (IR) sensors, etc. may be included.

The monitoring system 12 may be included on the vehicle 10 at the time of manufacturer/assembly as an original equipment manufacturer (OEM) system and/or added after vehicle manufacturer/assembly as an aftermarket system. The monitoring 12 system is shown to facilitate positioning the camera 14 to peer through the spare tire 16 so that a majority of an associated viewing angle 18 is unobstructed. The monitoring system may beneficial at the time of vehicle assembly/manufacturer to accommodate manufacturing variances associated with different vehicle models, trim packages or customer preferences and/or after vehicle assembly/manufacturer to accommodate OEM component modifications or the addition of aftermarket items. The camera 14 may be attached to a spare-tire hub assembly 20 without damaging or others permanently disfigure body panels, bumpers, etc. with brackets, through-holes or other features added to support/mount the camera. The elevated positioning of the camera may also be beneficial in allowing images/video to be captured above a rear bumper to provide better feedback than images captured from lower areas of the vehicle and/or to facilitate augmenting or displaying images in cooperation with an OEM camera included in the bumper or other lower area of the vehicle (not shown).

Figure 2:
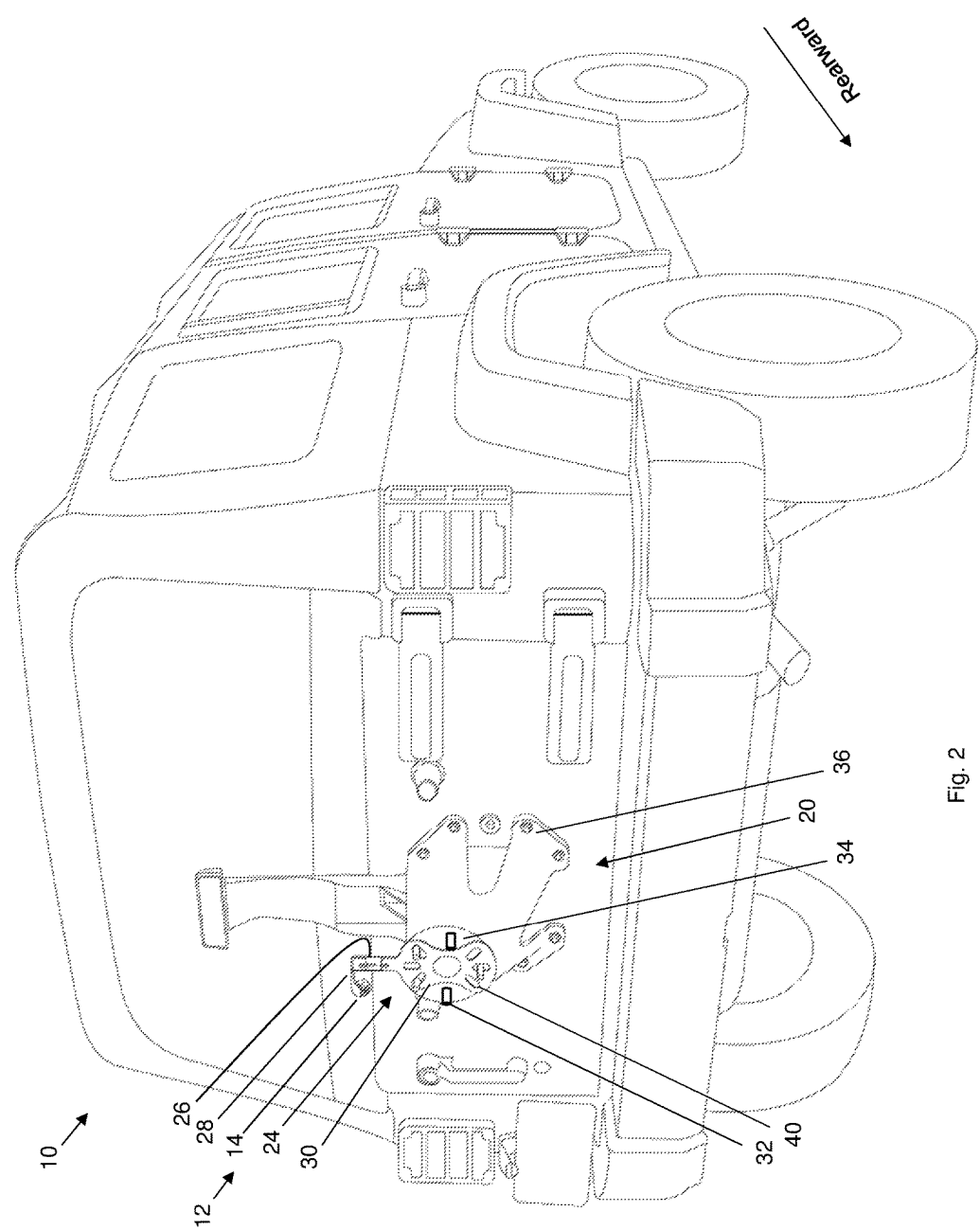
FIG. 2 illustrates a more detailed view of the monitoring system in accordance with one non-limiting aspect of the present invention.

FIG. 2 illustrates the spare tire 16 removed to provide a more detailed view of the monitoring system 12 in accordance with one non-limiting aspect of the present invention. The monitoring system 12 may include a mounting system 24 configured for mounting and adjusting positioning of the camera 14 on the spare-tire hub assembly 20 included on a rearward end of vehicle 10. The mounting assembly 24 is shown to facilitate arranging the camera 14 in the elevated position using a linkage 26 and an arm 28 interconnecting with a plate 30 supported on a plurality of studs 32 extending from a vertical surface 34 of a tire hub/mount 36 included as part of the spare-tire hub assembly. A plurality of apertures 40 included in the plate 30 may be arranged in a predefined pattern and shaped to permit one or more of the plurality of studs 32 to fit therethrough for purposes of securely mounting to the vehicle 10. The plurality of apertures 40 may cooperate with the linkage 26 and the arm 28 to facilitate orientating the plate 30 at a number of angles and positions so as to provide variability in positioning the camera 14 to accommodate various spare tire sizes and/or other obstructions that may be present on the vehicle 10 while also providing multiple attachment options to facilitate usage with other spare-tire hub assembly configurations.

The monitoring system 12 may include a cable (not shown) threaded through the vehicle 10 to facilitate communications between the camera 14 and the passenger-compartment display system. The cable may be concealed along the length of the vehicle 14 between interior trim and exterior body panels, under carpeting, etc. whereby access thereto may be gained by removing trim panels, wedging the cable through channels or cracks created between adjoining body panels and/or discretely adding a small through hole or other relief. The camera 14 may also include wireless capabilities sufficient to facilitate wirelessly communicating the images/video to the passenger-compartment display system instead of the cable. As shown in FIG. 1, a plurality of fasteners 44 may be threaded or otherwise attached rearward of a rim 46 of the spare tire 16 to one or more of the plurality of studs 32 to secure the spare tire 16 thereto. The plate 30 may be positioned between the spare tire 16 and the vertical surface 34 of the hub 36 for securement via a compressive force generated with the plurality of fasteners 44 engaging with a corresponding one of the plurality of studs 32. The mounting system 24 may provide a stable platform for the camera 14 against vibrations and other forces generated while the vehicle 10 is driven to prevent camera displacement.

The mounting system 24 is shown to be secured via the fasteners 44 and studs 32 for exemplary and non-limiting purposes as the plate 30 or other feature of the mounting system 24 may be affixed to the vertical surface 34 or other component of the spare-tire hub assembly 20 and/or the vehicle 14 without deviating from the scope and contemplation of the present invention. Additional features for securing the plate 30 to the spare-tire hub assembly 20 or other feature of the vehicle 10 may include straps, clamps, screws, adhesive materials and the like as well as press-fit washers, gaskets, dampeners and other mechanisms to limit vibration and other disruptions and/or to facilitate supporting the mounting system 24 when assembling. The fasteners 44 may be threaded nuts capable of being easily attached and removed from the studs 32 to facilitate removably attaching the mounting system 24. The apertures 40 may also include press-fitting elements or similar components to facilitate affixing itself to the studs 32 independently of and/or in addition to the fasteners 44. The plate 30, linkage 26 and arm 28 are described as being independent, standalone components configured to provide mechanical interconnections therebetween for exemplary non-limiting purposes as one or more of the plate 30, linkage 26 and arm 28 may be integral or formed from the same or a singular piece of material and/or omitted, e.g., the arm 28 and/or the camera 14 may be attached directly to the plate 30.

Figure 3:
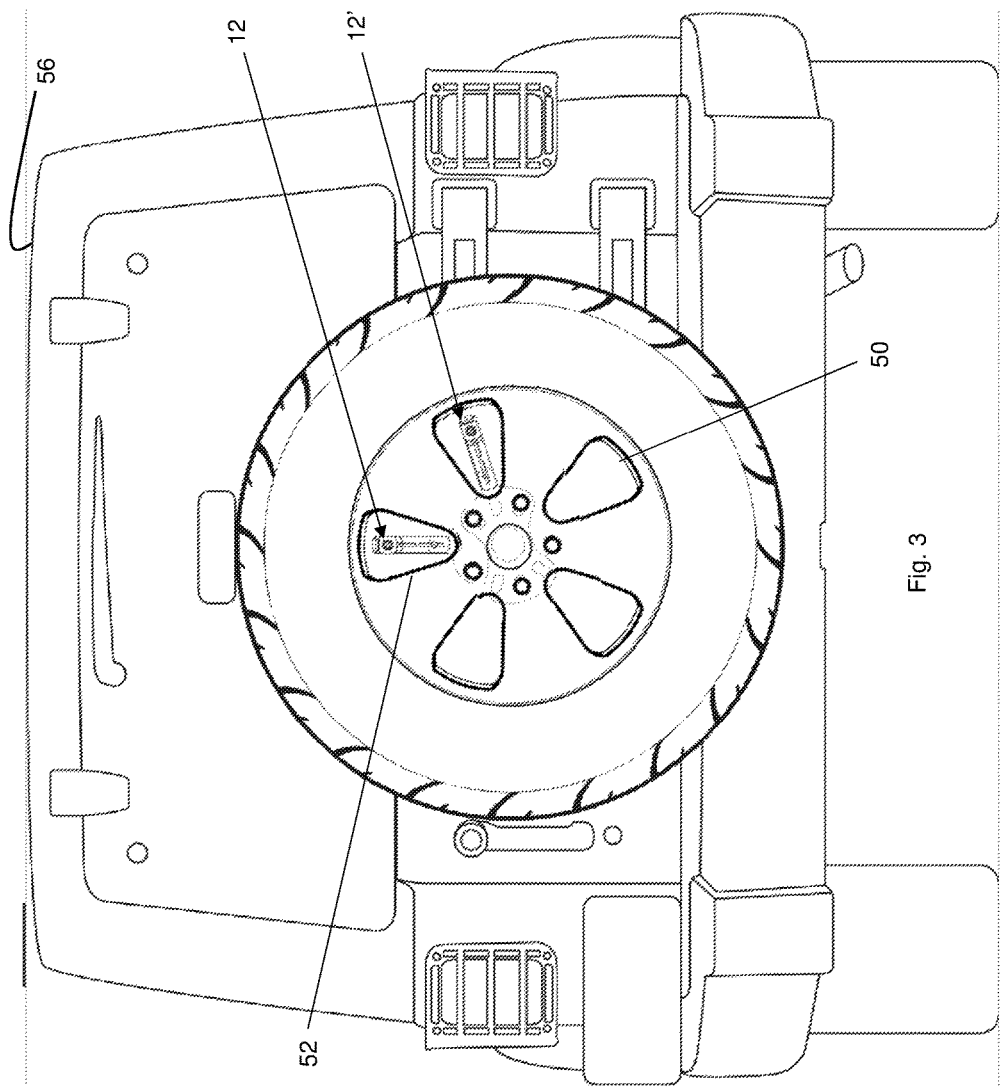
FIG. 3 illustrates a rear-view of the monitoring system in accordance with one non-limiting aspect of the present invention.

FIG. 3 illustrates a rear-view of the monitoring system 12 in accordance with one non-limiting aspect of the present invention. The rear-view illustrates the mounting system 24 positioning the camera 14 to peer through one of a plurality of openings 50 radially arranged about a center of the rim (shown in two positions 12, 12'). The mounting system 24 may be configured to position the camera 14 proximate a rearward face 52 of the rim 46 defined along a rearward edge of the opening 50 so as to enable substantially all of the viewing angle 18 to be unobstructed, e.g., the camera 14 may have a 180° or other viewing angle whereby positioning even with or rearward beyond the rearward edge 52 of the opening 50 to permit the viewing angle to be substantially unobstructed. The positioning of the camera 14 within one of the openings 50 is shown for exemplary non-limiting purposes as the present invention fully contemplates adjusting or configuring a size and/or shape of the mounting system 24, e.g., lengthening the linkage 26 and/or the arm 28, such that the camera 14 can be positioned above or outside of an outer perimeter of the spare tire 16 in a position sufficient to peer around the spare tire 16. The ability to position the camera 14 above or outside of the spare tire 16, and optionally above a top 56 of the vehicle 10, may be beneficial in providing a 360° view around the vehicle 10 in the event the camera 14 includes a 360° viewing angle and/or in the event multiple cameras are mounted towards different areas.

Figure 4:
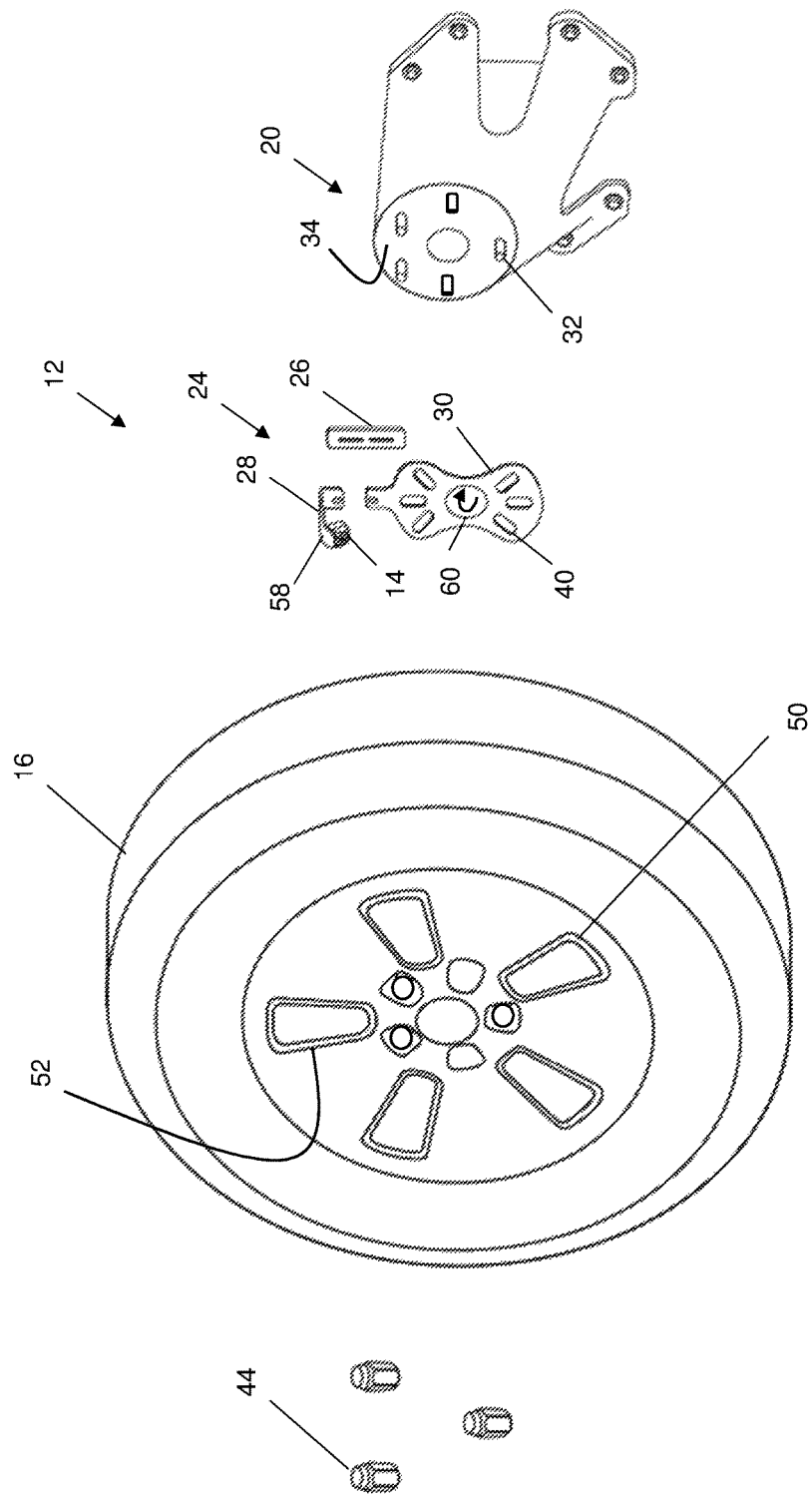
FIG. 4 illustrates an assembly view of the monitoring system in accordance with one non-limiting aspect of the present invention.

FIG. 4 illustrates an assembly view of the monitoring system 12 in accordance with one non-limiting aspect of the present invention. The assembly view illustrates an exemplary attachment of the spare tire 16 to the spare-tire hub assembly 20 using three fasteners 44 to secure the studs 32 and the mounting system 24 positioned therebetween. The mounting system 24 is shown as being arranged to position the camera 14 in a straight line or in a direction that may be characterized as directly upward or vertical. This positioning may correspond with the plate 30 being parallel with the hub surface 34 and with the arm 28 orientating the camera 14 in a direction predominantly perpendicular thereto such that an angle of the camera 14 is acute to the plate 30 and hub surface 34. A distal end 58 of the arm 28 affixed to the camera 14 is shown as being articulated to facilitate directing the camera 14 in a downward direction to provide a desired viewing area for the driver when in the illustrated position. An arrow 60 is shown for illustrative purposes to highlight the adjustability of the mounting system 24 whereby the plate 30 may be rotated to facilitate orientating any one or more of the apertures 40 relative to the rearwardly extending studs 32. The capability to adjust the plate 30 in this manner may be beneficial in orientating the mounting system 24 with different stud configurations and/or arrangements other than the illustrated equidistant, radial spacing.

FIG. 5 illustrates a perspective view of the mounting system 24 and a connection of the camera 14 to the display system 62 in accordance with one non-minting aspect of the present invention. A cable 64 may include a connector 66 or other suitable feature for plugging into a junction box, control module or other feature associated with the display system 62, e.g., the connector 66 may attached to an in-dash panel associated with an existing infotainment system, radio, heads-up display, etc. The display system module may include software stored on a memory and a processor to facilitate processing and displaying images provided from the camera. A reflash or other memory altering process may be performed to re-program the module to facilitate processing data from the camera 14 to work with existing display elements within the vehicle 10. A display may also be added to the vehicle 10 in the event the vehicle 10 lacks an existing display capability sufficient to facilitate providing the desired feedback to the driver. The cable 64 is shown as being loosely led from the camera 14 for illustrative purposes as shrink wrap, zip ties or other features may be included to attach the cable 64 to portions of the hub assembly 20 while being fed back into the vehicle 10 for connection.

The camera 14 is shown as a charge-coupled device (CCD) attached to the distal end 58 of the arm using 28 a threaded screw 68 to provide an essentially unmovable connection for exemplary purposes as the camera 14 may be affixed thereto using other features, such as but not necessary limited to a clip, a micro-hinge or other element sufficient to retain the camera in a desired position against vibratory forces generated during vehicle operation. An arm fastener 70 and a plate fastener 72 may be included to respectively attached the arm 28 to the linkage 26 and the linkage 26 to the plate 30. The arm and plate fasteners 70, 72 may be threaded screws, bolts and nuts or other connectors sufficient to enable the components to rotate about corresponding pivot points and thereafter be secured in place. The arm and plate fasteners 70, 72 are shown to be secured within a respective one of an arm channel 74 and a plate channel 76 included within the linkage 26. The arm and plate fasteners 70, 72 may be fastened at any point along the corresponding arm and plate channels 74, 76 to facilitate longitudinally adjusting positioning therein. Reference arrows are shown to demonstrate four-degrees of movement resulting from the radial and longitudinal adjustment capabilities associated with the arm and plate fasteners and channels 70, 72, 74, 76. When coupled with the above-described radial adjustment of the plate 30, the mounting system 24 may be characterized as exhibiting five-adjustment mechanisms to facilitate positioning the camera 14 in the illustrated x, y and z directions.

The apertures 40 included in the plate 30 are shown as being shaped to include a width (W) slightly greater than a diameter of the studs 32 and a length (L) greater than the width. The shaping of the apertures 40 may be beneficial in further facilitating positioning of the camera 14 and providing flexibility sufficient to accommodate studs 32 arranged in a different manner, i.e., the length being greater than the width enables the studs 32 to be positionable there along to facilitate longitudinal adjustments. Press nuts or other elements may optionally be included within the apertures 40 or added thereafter to facilitate maintaining orientation of the plate 30 to the studs while the spare tire fasteners 44 are being applied, e.g., press nuts can be used to temporarily hold the plate 30 in position until the spare tire 16 is attached. The apertures 40 are also shown as being non-equidistantly spaced relative to a center of the plate 30 so as to provide additional options when being orientated for connection to the studs 32. The apertures 40 may be formed in the illustrated pattern with three aperture proximate an upper half of the plate 30 near the camera 14 and three apertures proximate a lower half so as to ensure at least one, and preferably two, of the studs 32 can fit therethrough. The apertures 40 are illustrated as each having the same, generally elongated shape for exemplary, non-limiting purposes as apertures 40 having other shapes and sizes are contemplated, including some of the apertures 40 having different shapes/sizes than the others.

The size and shape of the plate 30 may also be similarly adapted to facilitate attachment to other vehicle components besides the spare tire hub assembly 20. A center aperture 80 may be included to accommodate shafts or other protuberances that may be included on spare-tire hub assemblies differing from that illustrated above, such as spare-tire hub assemblies that utilize an axle instead of or in addition to the above-described studs 32 to facilitate spare tire attachment. The plate 30 may include a body portion 82 having a generally cello shape with a tab 84 extending therefrom proximate a central one of the top apertures 40. The cello shape may be beneficial in limiting the amount of material used in forming the plate 30 as well as to facilitate ease of handling and placement relative to the spare-tire hub assembly 20. The tab 84 may be an optional feature included to facilitate attachment to the linkage 26 and/or the arm 28, i.e., the arm 28 can be attached directly to the tab 84 without use of the linkage 26 and the arm 28 and/or the linkage 26 may be attached to the body portion 82 without use of the tab 84.

As described above, one aspect of the present invention contemplates a camera mounting system including a structure, bracket to clear the tire (z-dimension), and a second adapter bracket to provide an x-y adjustment and then a base mounting bracket with the function to facilitate the camera mounting to the car without interfering with the wheel attachment functionality, the lug nuts. The contemplated design may be used to provide a better rear camera mounting solution for vehicles like the Jeep Wrangler that has a spare tire carrier on the back of the vehicle. The design solution involves an easy-to-install stamped metal bracket to mount a rear-facing camera that places the camera in a high, centered, protected position. The bracket mounts easily between the spare tire wheel and the spare tire-mounting bracket of the vehicle. This sandwich design holds the bracket secure at all times. A camera is mounted to the top of the bracket and designed to be thin enough to "poke out" of the spare tire wheel design once the spare tire is remounted to the vehicle. Wiring from the camera is run through the vehicle to a source of electrical power and a signal source for when the vehicle is put in reverse. The back-up camera mounting bracket also features adjustability for different spare tire wheel designs. Unique wheels and tires are a common automotive aftermarket accessory, and available designs for purchase run into the hundreds, or several hundreds. It's very hard to predict exactly how the between-spoke openings of the spare tire will orient once mounted, there is no standard. As such, this solution for adapting a wheel-spoke opening camera mount features an adjustable mounting bracket extension that allows for height (up-down), width (side to side) and depth (in and out) adjustability to allow the camera to protrude from the vast majority of wheel designs. By being securely mounted behind the spare tire, with the camera protected within the opening of the wheel, the system is unobtrusive, unlikely to get knocked into, and is very hard for a thief to remove.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mounting system for mounting a camera of a backup-camera system to a spare-tire hub assembly affixed to an exterior, rearward portion of a vehicle for purposes of securing a spare tire thereon in an exposed, vertical orientation, the mounting system comprising:
  a plate having a plurality of apertures radially arranged in a pattern sufficient for at least two of a plurality of studs extending rearwardly from a vertical surface of the spare-tire hub assembly to fit therethrough, the plurality of studs being radially arranged equidistantly around a center point to extend through a plurality of through holes included within a rim of the spare tire for purposes of securing the spare tire in the exposed, vertical orientation;
  an arm mechanically coupled to the plate to facilitate positioning the camera radially outboard of the plurality of studs in a mounted position sufficient for the camera to peer through the spare tire;
  a linkage for mechanically coupling the arm to the plate;
  a plate fastener for removably attaching the linkage to the plate and an arm fastener for removably attaching the linkage to the arm;
  wherein the plate fastener provides a plate pivot sufficient for rotating the linkage relative to the plate and wherein the arm fastener provides an arm pivot sufficient for rotating the arm relative to the linkage, thereby providing two rotational degrees of movement to facilitate positioning the camera while the at least two of the plurality of studs are fitted through the plate; and
  wherein the linkage includes a plate channel and an arm channel with each of the plate and arm channels being elongated, the plate fastener being removably attachable along the plate channel to adjust positioning of the plate longitudinally therein and the arm fastener being removably attachable along the arm channel to adjust positioning of the arm longitudinally therein, thereby providing two longitudinal degrees of movement to facilitate positioning the camera while the at least two of the plurality of studs are fitted through the plate;
  wherein the plate fastener and the arm fastener are threaded screws configured to respectively attach the linkage to the plate and the arm without use of nuts or additional connectors.

2. The mounting system of claim 1 wherein:
  a distal end of the arm proximate an attachment to the camera is shaped to be at an angle relative to the linkage;
  the plurality of apertures are arranged non-equidistantly around a center of the plate;
  a quantity of the plurality of apertures is greater than a quantity of the plurality of studs;
  the plurality of studs are shaped as cylinders and wherein the plurality of apertures are shaped to have a width greater than a diameter of the cylinders and a length longer than the width; and
  the mounted position is sufficient for a majority of a viewing angle of the camera to be unobstructed by the spare tire.

3. The mounting system of claim 1 wherein:
  the linkage is planar throughout;
  the linkage is parallel with the plate when attached thereto with the plate fastener; and
  the arm includes a connection end and a distal end with a central portion extending therebetween, wherein the connection end and the distal end are each angled relative to the central portion.

4. The mounting system of claim 3 wherein the connection end is angled at 90° relative to the central portion and the distal end is angled at greater than 90° relative to the central portion, thereby positioning the distal end rearwardly of the linkage and the plate when attached to the linkage.

5. The mounting system of claim 4 wherein the linkage has a length sufficient for positioning the camera to peer through an opening in the rim when the at least two of the plurality of studs are fitted through the plate and the spare tire is thereafter secured to the spare-tire hub assembly.

6. The mounting system of claim 5 wherein:
  the distal end includes a first orifice;
  the connection end includes a second orifice, the second orifice being circular and having a diameter larger than a cross-section of the arm fastener;
  the arm fastener passes through the second orifice to attach the connection end to the linkage, thereby centering the arm pivot within the second orifice; and
  the camera includes a screw for mounting within the first orifice.

7. The mounting system of the claim 6 wherein:
  the camera has a viewing angle; and
  the central portion is elongated an amount sufficient to position the distal end rearward of the spare tire such that the viewing angle of the camera is unobstructed by the spare tire.

8. The mounting system of claim 7 further comprising a press-fit washer for each of the at least two of the plurality of studs fitted through the plate, the press-fit washers being sufficient for retaining the plate to the at least two of the plurality of studs prior to securing the spare tire to the spare-tire hub assembly.

9. The mounting system of claim 8 wherein: the threaded screws removably engage the elongated sides to permit re-positioning of the arm relative to the plate while the press-fit washers immovably retain the plate to the spare-tire hub assembly.

10. A monitoring system for a vehicle, the vehicle having a spare-tire hub assembly for securing a spare tire to a rear door or other rear-facing component in an exposed orientation and a passenger-compartment display system capable of displaying images and/or video to a vehicle occupant, the system comprising:
  a camera configured for conveying recorded images to the display system for display to the vehicle occupant; and
  a mounting system configured for attaching the camera to the spare-tire hub assembly, the mounting system including:
    i) a plate having a plurality of apertures sufficient for at least one of a plurality of studs extending rearwardly from the spare-tire hub assembly to fit therethrough, the plurality of studs extending rearwardly to fit through a plurality of through holes included within a rim of the spare tire in order to secure the spare tire in the exposed orientation, the plate including a tab outward of the plurality of apertures, the tab including a first orifice;
    ii) an arm having a connection end and a distal end with a central portion extending therebetween, the connection end and the distal end each being angled relative to the central portion, the camera being affixed to the distal end, the connection end including a second orifice, the first and second orifices being circular;
    iii) a linkage planar throughout for mechanically connecting the arm to the plate such that the connection end and the tab are coplanar and parallel with the linkage, the linkage including a plate channel and an arm channel with each of the plate and arm channels being elongated;
    iv) a plate fastener for removably attaching the plate via the first orifice within the plate channel and an arm fastener for removably attaching the arm via the second orifice within the arm channel, the plate and arm fasteners being respectively securable along and rotatable about the plate and arm channels to facilitate radially and longitudinally adjusting positioning of the camera; and wherein the plate and arm fasteners are threaded screws with threads shaped to respectively engage sides of the plate and arm channels to attach the plate and the arm to the linkage without use of nuts or additional connectors.

11. The system of claim 10 wherein the camera is configured for wirelessly conveying the recorded images to the display system.

12. The system of claim 10 further comprising a plurality of stud fasteners attached to a corresponding one of the plurality of studs between the plate and the spare tire to secure the plate against the spare-tire hub assembly, wherein the threaded screws permit the arm to be radially and longitudinally adjusted relative to the plate while the plurality of stud fasteners are attached to the plurality of studs.

13. A monitoring system for a vehicle, the vehicle having a spare-tire hub assembly for securing a spare tire to a rear door or other rear-facing component and a passenger-compartment display system capable of displaying to a vehicle occupant, the system comprising:
a camera for conveying images to the display system for display to the vehicle occupant; and
a mounting system for attaching the camera to the spare-tire hub assembly, the mounting system including:
i) a plate having a plurality of apertures sufficient for at least one of a plurality of studs extending rearwardly from the spare-tire hub assembly to fit therethrough, the plate including a first orifice outward of the plurality of apertures;
ii) an arm having a connection end and a distal end, the camera being affixed to the distal end and the connection end including a second orifice;
iii) a linkage interconnecting the plate with the arm, the linkage including a plate channel and an arm channel with the plate and arm channels being elongated;
iv) a plate fastener positioned through the first orifice removably attaching the plate to the plate channel using threads that engage sides of the plate channel; and
v) an arm fastener positioned through the second orifice removably attaching the arm to the arm channel using threads that engage sides of the arm channel.

14. The system of claim 13 wherein the arm and plate fasteners are screws.

15. The system of claim 14 wherein rotation of the arm and plate screws in a first direction causes the threads to increase engagement with the sides of the corresponding one of the plate and arm channels and rotation of the arm and plate screws in a second direction opposite to the first direction causes the threads to decrease engagement with the sides of the corresponding one of the plate and arm channels, thereby permitting the plate and arm screws to removably engage the sides of the corresponding one of the plate and arm channels and to be radially and longitudinally re-positionable along the corresponding one of the arm and plate channels so as to enable corresponding re-positioning of the arm relative to the plate.

16. The system of claim 15 wherein:
the mounting system includes a plurality of stud fasteners attached to two or more of the at least one of the plurality of studs extending through the plate to secure the plate to the spare-tire hub assembly; and
the arm and plate screws permit the re-positioning of the arm while the plurality of stud fasteners secure the plate to the spare-tire hub assembly.

* * * * *